United States Patent [19]

Carbrey

[11] 4,171,466
[45] Oct. 16, 1979

[54] DIGITAL WAVE GENERATOR FOR COMPOSITE TONE

[75] Inventor: Robert L. Carbrey, Boulder, Colo.

[73] Assignee: Bell Telephone Laboratories, Incorporated, Murray Hill, N.J.

[21] Appl. No.: 796,977

[22] Filed: May 16, 1977

[51] Int. Cl.² ............................................... H04J 3/12
[52] U.S. Cl. ......................... 179/15 BY; 179/84 VF; 328/27
[58] Field of Search ........... 179/15 BY, 15 A, 84 VF; 328/21, 27; 307/229

[56] References Cited

U.S. PATENT DOCUMENTS

| Re. 29,215 | 5/1977 | Carney | 179/15 A |
| 3,931,480 | 1/1976 | Poole | 179/84 VF |
| 3,985,956 | 10/1976 | Field | 179/15 BY |

Primary Examiner—David L. Stewart
Attorney, Agent, or Firm—Roy C. Lipton

[57] ABSTRACT

Digital words defining magnitude levels of samples of phases of a wave cycle are stored in two memories arranged to store samples of 440 Hz and 480 Hz tones. The words are read out of the memories in a predetermined order which defines successive phases of the wave cycles, each word being read out a plurality of times before the next successive word is read to increase the sample rate without increasing the number of stored words. The words are converted to the defined levels to form step waves corresponding to the two tones and summed and the resultant composite wave is integrated to form a relatively smooth composite tone (ringback) signal.

1 Claim, 6 Drawing Figures

DIGITAL WAVE GENERATOR FOR COMPOSITE TONE

FIELD OF THE INVENTION

This invention relates to tone generators and, more particularly, to generators of digital signals which define samples of analog tones.

DESCRIPTION OF THE PRIOR ART

It is now well known that there is an economic advantage to using digital transmission networks for switching systems. Such systems are obvious places to generate tones (such as dial, busy, ringback, et cetera) directly in digital form. In some situations, it is also advantageous to generate the tone digitally for analog switching networks and, at the generator, convert the digital signals to the defined analog tones.

One class of digital tone generators involves the storage of digital words in a read-only memory (ROM), which digital words define or represent magnitudes of samples of successive phases of a sine wave cycle. By reading out the digital words in a predetermined order and converting the words to the defined magnitudes, samples of successive phases of the wave cycle are thereby formed.

It is a broad object of this invention to provide a digital tone generator which stores digital words defining samples of a wave cycle.

The frequency of the tone wave produced by the digital generator is jointly determined by the rate that the words are read out of memory and the phase angle between the successive samples. Typically, the frequency of the tone desired is fixed and the sampling rate is predetermined by system requirements. The phase angle can then be calculated in accordance with the appropriate interrelationship between the three parameters. The digital words defining the samples of a sine wave cycle separated by the calculated phase angle is then readily determinable.

In digital transmission networks for switching systems it is advantageous to use a higher sample rate than the theoretical Nyquist rate of twice the highest frequency which is to be transmitted because this permits simpler and hence less expensive and less precise input anti/aliasing filters and output signal reconstruction and sampling frequency sideband rejection filters. A sampling frequency of 16 kilohertz is a good engineering compromise between filter simplification and system channel capacity for a nominal 3.4 kilohertz voiceband. If, in such a system, audible tone signals of fixed frequency are to be generated by digital means from sample value words stored in a digital memory, the higher system sampling rate would normally require a smaller phase angle for the stored digit words. This, in turn, results in more sample values per wave cycle and thus a much larger digital memory is required for the additional digital words thereby reducing the economic advantage of digital generation.

It is a further object of this invention to provide a higher sampling rate without reducing the economic advantage of digital generation.

SUMMARY OF THE INVENTION

In accordance with the objects of this invention, each digit word read from the memory is produced a plurality of times before the next digit word in the predetermined order is read from the memory. The rate that the words are produced may thereby be increased without increasing the number of words that have to be stored. More specifically, each digit word is read from the memory the plurality of times before the next digit word in the predetermined order is read.

It is a feature of this invention that the produced digit words are converted to the defined samples. The samples are then integrated by a charge ratio amplifier to thereby form a relatively smooth waveform in which each sample increment contributes to the tone wave.

In the illustrative embodiment of this invention described hereinafter, there is disclosed a composite tone signal generator which includes two digital word memories for storing digit words defining magnitude levels of samples of phases of cycles of tone signals. The stored digit words are read out of the memories in an order which defines levels of successive samples of phases of cycles of a first tone having a first frequency (440 Hz) and a second tone having a second frequency (480 Hz), each read out word being repeated a plurality of times. The repeated words from each memory are then converted to the defined levels to form step waves roughly corresponding to each of the two tone signals. The two step waves are summed and the resultant composite wave is integrated to form a smooth composite tone (ringback) signal.

The foregoing and other objects and features of this invention will be more fully understood from the following description of the illustrative embodiment taken in conjunction with the accompanying drawing.

DETAILED DESCRIPTION

Figure 1:
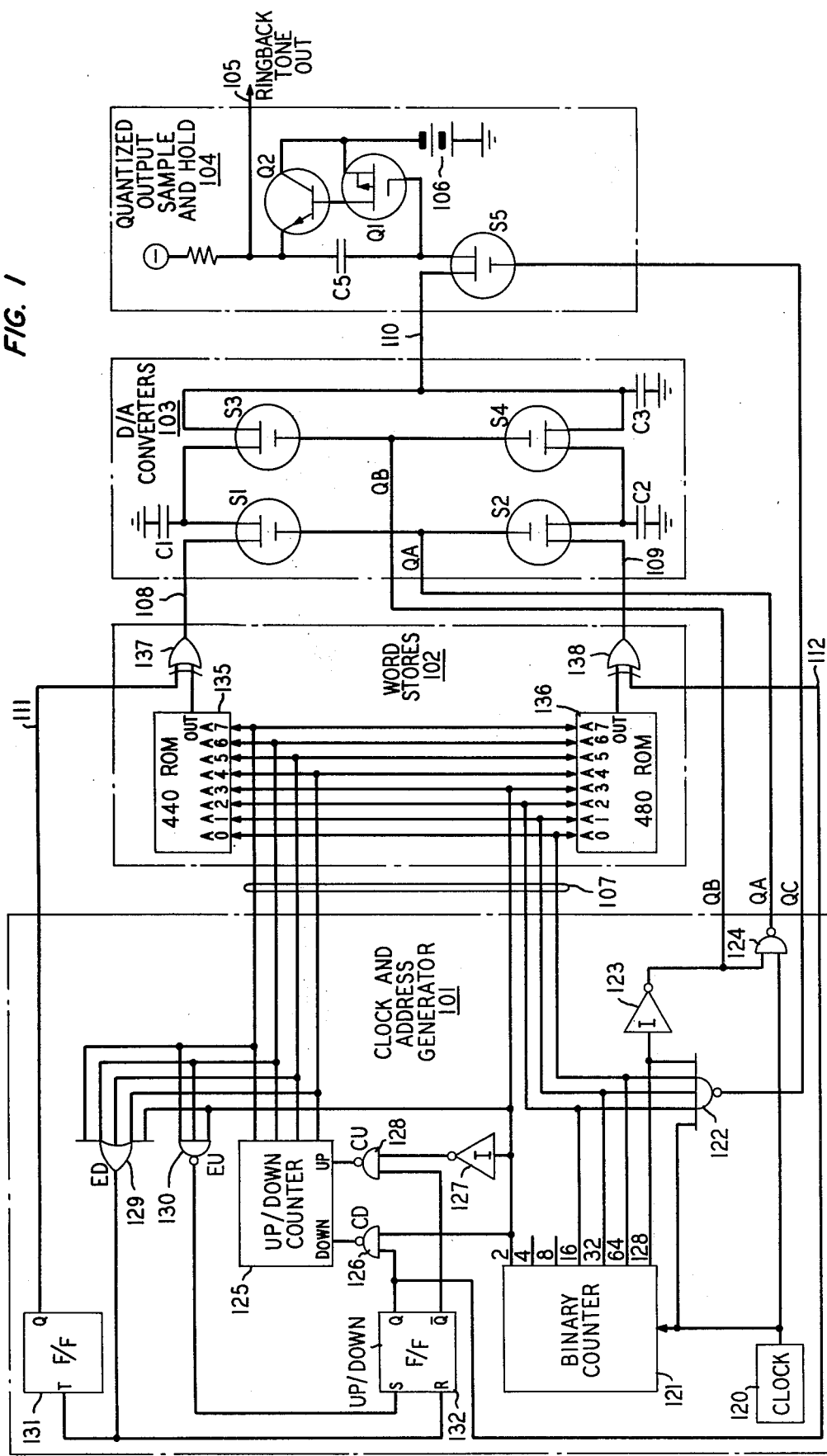
FIG. 1 discloses, in schematic form, the details of various circuits and equipment which form a multiple tone generator in accordance with this invention.

The principal components of the composite tone generator are clock and address generator 101, word stores 102, digital-to-analog converters 103 and quantized sample and hold circuit 104. The resultant ringback tone which is generated by the tone generator components is applied by quantized sample and hold circuit 104 to output lead 105.

Clock and address generator 101 generates various addresss and clocking signals for the tone generator. The address signals are applied to multiple leads 107 as an eight parallel bit address word and passed to word stores 102. Word stores 102, in response to each address word on multiple leads 107, reads out a bit for an eight bit digital word, which word defines the magnitude of a sample of a 440 Hz tone and simultaneously reads out a bit for an eight bit digit word, which latter word defines the magnitude of a sample of a 480 Hz tone. The bit of the 440 Hz digital word, or the complement thereof as controlled by a control signal on lead 111, is passed to digital-to-analog converters 103 by way of lead 108. The bit of the 480 Hz digital word, or the inversion thereof as controlled by the control signal on lead 112, is passed by way of lead 109 to digital-to-analog converters 103. Accordingly, clock and address generator 101 generates successive address words and, in response to each address word, word stores 102 reads out a bit for a digit word for a 440 Hz tone and a bit for a digit word for a 480 Hz tone. Serial bits are thus passed to leads 108 and 109, each digit word comprising eight serial bits. It is an important feature that clock and address generator 101 is arranged to generate four repetitive cycles of address words to enable word stores 102 to repeat the readouts of each digital word four times.

A gate pulse on lead QA from clock and address generator 101 gates or switches each of the two bits on leads 108 and 109 into capacitive stores in digital-to-analog converters 103. Immediately thereafter a gate pulse on lead QB from clock and address generator 101 redistributes the capacitive store charges corresponding to the bits to a common capacitor, summing them with priorly stored charges corresponding to prior bits of the two digit words at an appropriate quantum level, as described further hereinafter. The output on lead 110, after all of the bits of each pair of 440 Hz and 480 Hz digital words have been received on leads 108 and 109, constitutes the average magnitude level defined by the two digit words. This magnitude level signal comprises a sample of the ringback tone signal.

The sample on lead 110 is switched to quantized output sample and hold circuit 104 by a gate pulse on lead QC. Quantized sample and hold circuit 104 sums a proportional ratio of this sample level with the level held in the circuit from previous samples. This has the effect of integrating (or smoothing) the wave samples and this new resultant level is passed on out to lead 105.

The clock circuit in clock and address generator 101 is symbolicaly shown as clock 120. The output of clock 120 is, for example, a square wave having a 256 kilobit rate. The timing wave output of clock 120 is shown as wave CLOCK in FIG. 2.

The clock wave drives binary counter 121. Binary counter 121 has seven stages, each stage providing a square wave output which is at one-half the rate of the prior stage. The output rates of the stages are therefore 128, 64, 32, 16, 8, 4 and 2 kilobits per second, which outputs are applied to correspondingly numbered output terminals as shown in FIG. 1. The 128 kilobit output of binary counter 121 is passed through inverter 123 to lead QB. The wave on lead QB is therefore the inversion of the 128 kilobit wave and this inverted wave is shown as wave QB (128) in FIG. 2. The 64, 32, 16 and 2 kilobit outputs of binary counter 121 are shown as timing waves 64 (A0), 32 (A1), 16 (A2) and 2 (A3) in FIG. 2.

The 16, 32 and 64 kilobit outputs of binary counter 121 extend to three leads of multiple address lead 107 and constitute the three least significant bits of the address word, which three bits define each bit of the digit word read out by word stores 102. The 64 kilobit wave provides two bits per cycle (a "0" bit followed by a "1" bit) and each bit constitutes the least significant bit of an address word. As seen in timing wave 64 (A0) of FIG. 2, a succession of the bits are labeled 1 through 8, constituting the least significant bits of eight address words which define the eight bits of a 440 Hz tone word and the eight bits of a 480 Hz tone word in word stores 102.

The 2 kilobit output wave [2 (A3)] also extends to address leads 107 and constitutes the least significant address bits identifying the digit words in word stores 102, as further described hereinafter. The 4 and 8 kilobit outputs of counter 121 are not utilized. The eight bits of each digit word are repeated four times since the eight bits of the 64 kilobit wave, as seen in FIG. 2, are repeated four times for each bit of the 2 kilobit 2 (A3) wave.

During the production of each bit on lead QB, NAND gate 124 is enabled. This permits clock 120 to pass a clock pulse therethrough, inverted, to lead QA resulting in the timing wave shown as QA in FIG. 2. This negative QA pulse occurs once per each bit of the 64 kilobit wave and, as described hereinafter, enables bits of the tone word on leads 108 and 109 to be gated into capacitive stores in summing digital-to-analog converters 103. During the subsequent portion of each bit of the 64 kilobit wave, the negative portion of the QB wave is produced permitting redistribution of the charges corresponding to the bits gated into digital-to-analog converters 103. Thus, for each address produced by clock and address generator 101, a pair of digit word bits are produced by word stores 102, and during each output bit interval of word stores 102, a QA pulse is produced by clock and address generator 101 to gate the bits into digital-to-analog converters 103 and a QB pulse is subsequently produced to redistribute the charge corresponding to the bits.

At the end of each 16 counts of binary counter 121, "1" bits appear on the 128, 64, 32 and 16 kilobit outputs. These "1" bits enable NAND gate 122, thereby passing a negative pulse to lead QC, which pulse is shown as timing wave QC in FIG. 2. As seen in FIG. 2, this enabling of NAND gate 122 and the consequent production of the QC pulse occurs after the production of each eighth bit of the 64 kilobit wave and after the generation of all eight bits of the multibit digital word by word stores 102. The QC pulse, which switches the analog sample output of digital-to-analog converters 103 to quantized output sample and hold circuit 104 is thus repetitively produced at the termination of the generation of each of the digital words.

Figure 2:
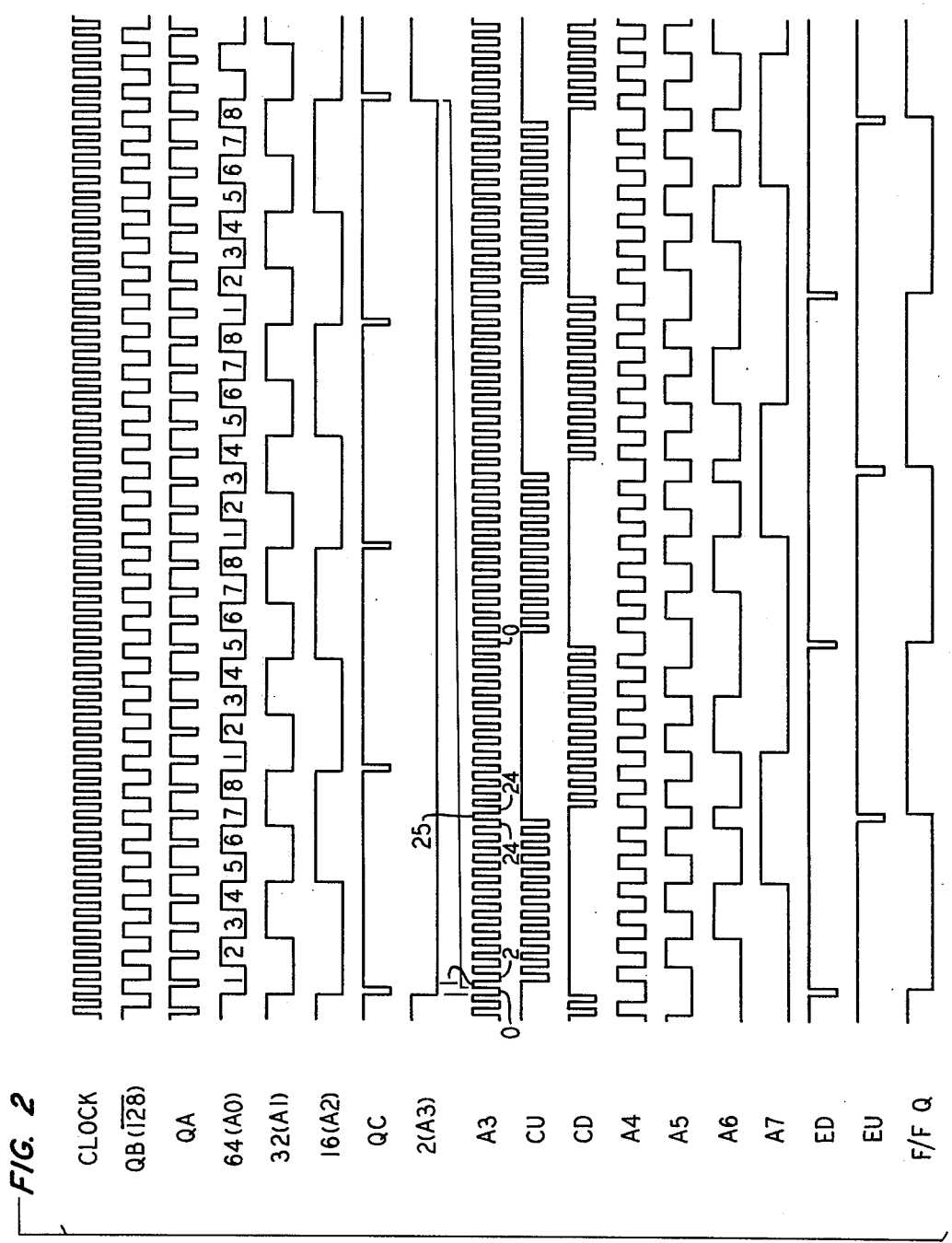
FIG. 2 depicts timing waves representing outputs of various circuits in the generator.

The 2 (A3) timing wave is shown, in FIG. 2, in reduced form as timing wave A3. The A3 wave, in addition to being passed to one of the leads of multiple leads 107, is also passed to count down gate 126, to end up gate 130, to end down gate 129 and to count up gate 128 by way of inverter 127. Count down gate 126 and count up gate 128 are NAND gates which are controlled by up/down flip-flop 132.

Assume first that flip-flops 131 and 132 are in the reset or clear conditions. Low conditions are applied to leads 111 and 112 to pass digit word bits in word stores uninverted to leads 108 and 109, as further described hereinafter. With flip-flop 132 cleared, a negative condition is provided to output terminal Q producing the F/FQ wave shown in FIG. 2. In addition, count up gate 128 is enabled and count down gate 126 is disabled. The A3 wave is thereby passed, inverted and reinverted, through count up gate 128 to form a wave shown as wave CU in FIG. 2. This CU pulse wave is applied to the "up" terminal of four-stage up/down counter 125 and the counter proceeds to count up from the count of "0" in response to the A3 pulses. The four outputs of the stage of counter 125 are shown as timing waves A4, A5, A6 and A7 in FIG. 2, with wave A4 constituting the least significant bit and A7 the most significant bit of the output number. These outputs of up/down counter 125 are passed by way of multiple leads 107 to word stores 102 and constitute the four most significant bits of the address word. As pointed out hereinafter, these four most significant bits together with the 2 kilobit output of binary counter 121 select the digit words read out of the word stores 102 and, as previously noted, the three least significant bits of the address word derived from down counter 125 define each of the eight bits in the digit words read out of word stores 102.

Counter 125 proceeds to count up through various successive counts in response to successive pulses of the wave. Successive digit words are thus defined by timing waves A3 through A7, which digit words can be numerically identified 0 through 25 by corresponding number identifications inserted in timing wave A3 as shown in FIG. 2. At the same time, count down gate 126 is blocked, as previously described, and its output is shown as timing wave CD.

The A3 timing wave continues to be passed through gate 128 to form the CU wave and up/down counter 125 continues to count up (for 24 bits of the A3 wave) until the counter achieves the count of 12. Upon the generation of bit 25 of the A3 wave, the two most significant bits of counter 125 are high and, since the bit 25 of the A3 wave is also high, end up NAND gate 130 is enabled during the positive interval of this 25th bit of the A3 wave generating a negative pulse to provide the timing wave defined as wave EU in FIG. 2.

The positive transition at the termination of the EU pulse sets flip-flop 132 applying a positive condition to lead 112, enabling count down NAND gate 126 and disabling count up NAND gate 128. The positive condition on lead 112 controls the inversion of the bits to be applied to lead 109, as described hereinafter. With gate 126 enabled, the next A3 pulse (identified as pulse 24) is passed, inverted, to the input "down" terminal of counter 125 and the output of gate 128 is simultaneously blocked to maintain the input to the "up" terminal high. Up/down counter 125 is now in the down count mode and the four most significant bits of the address words now proceed to down count from the count of 12 to the count of "0".

When the "0" count is reached, all of the outputs of up/down counter 125 are low as is the A3 bit. The output of end down OR gate 129 goes low for the A3 bit interval, which negative pulse wave is shown as wave ED in FIG. 2. At the termination of this pulse interval, the positive transition at the output of OR gate 129 toggles flip-flop 131 from the clear condition to the set condition applying a positive condition on lead 111. The positive transition of the ED pulse also resets flip-flop 132 to again enable count up gate 128, disable count down gate 126 and, at the same time, restore the low condition on lead 112. Up/down counter 125 now counts up from the count of "0", in the same manner as previously described and stored bits pass inverted to lead 108 and uninverted to lead 109.

Word stored 102 consist of serial output read-only memory (ROM) 135 which stores the digit words defining magnitudes of samples of the 440 Hz tone and read-only memory (ROM) 136 which stores the digit defining magnitudes of samples of the 480 Hz tone together with exclusive OR gates 137 and 138. The bits stored in read-only memory 135, in accordance with the address words applied thereto, is set forth in Table 1 below. The bits stored in read-only memory 136, in accordance with the address words applied thereto, is set forth in Table 2 below.

TABLE 1

| CODING OF 440 HZ STARTING AT 0° | | | | | | | | | | | | |
|---|---|---|---|---|---|---|---|---|---|---|---|---|
| | | | | | A0 | 0 | 1 | 0 | 1 | 0 | 1 | 0 | 1 |

TABLE 1-continued

| CODING OF 440 HZ STARTING AT 0° | | | | | | | | | | | | |
|---|---|---|---|---|---|---|---|---|---|---|---|---|
| | | | | | A1 | 0 | 0 | 1 | 1 | 0 | 0 | 1 | 1 |
| | | | | | A2 | 0 | 0 | 0 | 0 | 1 | 1 | 1 | 1 |
| A7 | A6 | A5 | A4 | A3 | | | | | | | | |
| 0 | 0 | 0 | 0 | 0 | 0 | 0 | 0 | 0 | 0 | 0 | 0 | 1 |
| 0 | 0 | 0 | 0 | 1 | 1 | 1 | 1 | 1 | 0 | 1 | 0 | 0 |
| 0 | 0 | 0 | 1 | 0 | 1 | 1 | 0 | 0 | 0 | 0 | 0 | 0 |
| 0 | 0 | 0 | 1 | 1 | 0 | 0 | 0 | 0 | 1 | 0 | 0 | 0 |
| 0 | 0 | 1 | 0 | 0 | 1 | 0 | 0 | 0 | 0 | 1 | 0 | 0 |
| 0 | 0 | 1 | 0 | 1 | 1 | 1 | 1 | 0 | 0 | 1 | 0 | 1 |
| 0 | 0 | 1 | 1 | 0 | 1 | 1 | 0 | 1 | 0 | 1 | 1 | 1 |
| 0 | 0 | 1 | 1 | 1 | 1 | 0 | 1 | 1 | 1 | 1 | 1 | 1 |
| 0 | 1 | 0 | 0 | 0 | 0 | 1 | 1 | 0 | 1 | 0 | 1 | 1 |
| 0 | 1 | 0 | 0 | 1 | 1 | 1 | 1 | 0 | 0 | 0 | 0 | 1 |
| 0 | 1 | 0 | 1 | 0 | 1 | 0 | 1 | 0 | 1 | 1 | 0 | 0 |
| 0 | 1 | 0 | 1 | 1 | 1 | 0 | 1 | 0 | 0 | 0 | 0 | 0 |
| 0 | 1 | 1 | 0 | 0 | 1 | 0 | 1 | 1 | 0 | 0 | 0 | 0 |
| 0 | 1 | 1 | 0 | 1 | 1 | 0 | 0 | 1 | 0 | 0 | 1 | 0 |
| 0 | 1 | 1 | 1 | 0 | 1 | 1 | 1 | 1 | 0 | 0 | 0 | 1 |
| 0 | 1 | 1 | 1 | 1 | 0 | 1 | 1 | 0 | 0 | 1 | 1 | 1 |
| 1 | 0 | 0 | 0 | 0 | 0 | 1 | 1 | 1 | 1 | 1 | 1 | 1 |
| 1 | 0 | 0 | 0 | 1 | 0 | 0 | 1 | 1 | 1 | 0 | 1 | 1 |
| 1 | 0 | 0 | 1 | 0 | 1 | 1 | 1 | 1 | 0 | 0 | 0 | 1 |
| 1 | 0 | 0 | 1 | 1 | 0 | 0 | 1 | 1 | 1 | 1 | 0 | 0 |
| 1 | 0 | 1 | 0 | 0 | 1 | 1 | 1 | 0 | 0 | 0 | 0 | 0 |
| 1 | 0 | 1 | 0 | 1 | 0 | 1 | 0 | 1 | 0 | 0 | 0 | 0 |
| 1 | 0 | 1 | 1 | 0 | 0 | 1 | 0 | 0 | 0 | 0 | 1 | 0 |
| 1 | 0 | 1 | 1 | 1 | 1 | 1 | 1 | 0 | 1 | 0 | 0 | 1 |
| 1 | 1 | 0 | 0 | 0 | 1 | 0 | 0 | 0 | 0 | 1 | 1 | 1 |
| 1 | 1 | 0 | 0 | 1 | 0 | 1 | 1 | 1 | 1 | 1 | 1 | 1 |
| | | | | | $2^0$ | $2^1$ | $2^2$ | $2^3$ | $2^4$ | $2^5$ | $2^6$ | $2^7$ |

TABLE 2

| CODING OF 480 HZ STARTING AT 0° | | | | | | | | | | | | |
|---|---|---|---|---|---|---|---|---|---|---|---|---|
| | | | | | A0 | 0 | 1 | 0 | 1 | 0 | 1 | 0 | 1 |
| | | | | | A1 | 0 | 0 | 1 | 1 | 0 | 0 | 1 | 1 |
| | | | | | A2 | 0 | 0 | 0 | 0 | 1 | 1 | 1 | 1 |
| A7 | A6 | A5 | A4 | A3 | | | | | | | | |
| 0 | 0 | 0 | 0 | 0 | 0 | 0 | 0 | 0 | 0 | 0 | 0 | 1 |
| 0 | 0 | 0 | 0 | 1 | 0 | 1 | 1 | 0 | 1 | 0 | 1 | 1 |
| 0 | 0 | 0 | 1 | 0 | 0 | 1 | 1 | 1 | 1 | 1 | 1 | 1 |
| 0 | 0 | 0 | 1 | 1 | 1 | 0 | 0 | 0 | 0 | 1 | 1 | 1 |
| 0 | 0 | 1 | 0 | 0 | 1 | 1 | 1 | 1 | 0 | 0 | 0 | 1 |
| 0 | 0 | 1 | 0 | 1 | 1 | 0 | 1 | 0 | 1 | 1 | 0 | 0 |
| 0 | 0 | 1 | 1 | 0 | 1 | 1 | 0 | 0 | 0 | 0 | 0 | 0 |
| 0 | 0 | 1 | 1 | 1 | 0 | 0 | 1 | 0 | 1 | 0 | 0 | 0 |
| 0 | 1 | 0 | 0 | 0 | 0 | 0 | 0 | 0 | 0 | 1 | 1 | 0 |
| 0 | 1 | 0 | 0 | 1 | 1 | 0 | 1 | 1 | 1 | 1 | 0 | 1 |
| 0 | 1 | 0 | 1 | 0 | 0 | 0 | 0 | 1 | 1 | 1 | 1 | 1 |
| 0 | 1 | 0 | 1 | 1 | 0 | 1 | 0 | 0 | 1 | 1 | 1 | 1 |
| 0 | 1 | 1 | 0 | 0 | 0 | 1 | 1 | 1 | 0 | 1 | 0 | 1 |
| 0 | 1 | 1 | 0 | 1 | 1 | 0 | 0 | 0 | 1 | 0 | 1 | 0 |
| 0 | 1 | 1 | 1 | 0 | 1 | 0 | 1 | 1 | 0 | 0 | 0 | 0 |
| 0 | 1 | 1 | 1 | 1 | 1 | 1 | 1 | 0 | 0 | 0 | 0 | 0 |
| 1 | 0 | 0 | 0 | 0 | 0 | 1 | 0 | 0 | 0 | 0 | 1 | 0 |
| 1 | 0 | 0 | 0 | 1 | 1 | 1 | 1 | 1 | 1 | 0 | 0 | 1 |
| 1 | 0 | 0 | 1 | 0 | 1 | 1 | 0 | 1 | 0 | 1 | 1 | 1 |
| 1 | 0 | 0 | 1 | 1 | 0 | 0 | 1 | 1 | 1 | 1 | 1 | 1 |
| 1 | 0 | 1 | 0 | 0 | 0 | 1 | 0 | 1 | 0 | 0 | 1 | 1 |
| 1 | 0 | 1 | 0 | 1 | 0 | 0 | 0 | 0 | 1 | 1 | 1 | 0 |
| 1 | 0 | 1 | 1 | 0 | 0 | 1 | 1 | 1 | 1 | 0 | 0 | 0 |
| 1 | 0 | 1 | 1 | 1 | 1 | 0 | 0 | 0 | 0 | 0 | 0 | 0 |
| 1 | 1 | 0 | 0 | 0 | 1 | 0 | 0 | 1 | 0 | 1 | 0 | 0 |
| 1 | 1 | 0 | 0 | 1 | 0 | 0 | 0 | 0 | 0 | 0 | 0 | 1 |
| | | | | | $2^0$ | $2^1$ | $2^2$ | $2^3$ | $2^4$ | $2^5$ | $2^6$ | $2^7$ |

In the Tables the binary bits of each digit tone word are shown in each row on the right with the most significant bit on the far right. Thus, in Tables 1 and 2, the first digit word magnitude is 00000001 (a digit value of 128) and defines a sample of the 440 and 480 Hz tones, both samples (440 and 480 Hz samples) having a 128 magnitude and each tone wave (440 and 480 Hz) having a maximum magnitude of 256 and a minimum magnitude of "0". Each digit word is identified by the most significant bits A3 through A7 of the address word, which most significant address bits are shown to the left of each digit word. Thus, the first digit word is the digit word "0". Each bit of each digit word is defined by the least significant bits A0 through A2 of the address word, which least significant bits are shown above this bit of each digit word.

Recalling that each digit word is repeated four times, clock and address generator 101 first generates the address word for the least significant bit of digit word "0" and then generates the address of succeeding more significant bits up to the most significant bit of this digit word and then repeats this procedure three more times. Clock and address generator 101 next generates the address words for digit word "1", which is the second row of each Table, and the bits of these two digit words are successively generated four times. As previously described, clock and address generator 101 continues to generate addresses through the 26 digit words, reading out streams of bits from memories 135 and 136 as defined in Tables 1 and 2. Thereafter, after the generation of the 26 digit words, up/down counter 125 starts to down count; the bits of the digit words starting with the digit word "25" at the bottom of each Table are read out from the memory and continuing up to the bits of the first word of digit word "0". When the bits of digit word "0" are read out, the up count mode of counter 125 is reinitiated to repeat the prior cycle.

It is recalled that the complementing signals on leads 111 and 112 are being generated by clock and address generator 101. Lead 112 extends to exclusive OR gate 137. When a low potential is applied to lead 111, exclusive OR gate 137 passes the output of memory 135, unaltered, to lead 108. When a high condition is applied to lead 111, however, exclusive OR gate 137 inverts the output of memory 135 and passes this inverted output to lead 138. Similarly, when a low condition is applied to lead 112, exclusive OR gate 138 passes the output of memory 136, unaltered, to lead 109, whereas when a high condition is applied to lead 112, exclusive OR gate 138 inverts the output of memory 136 and passes the inverted output to lead 109.

Figure 3:
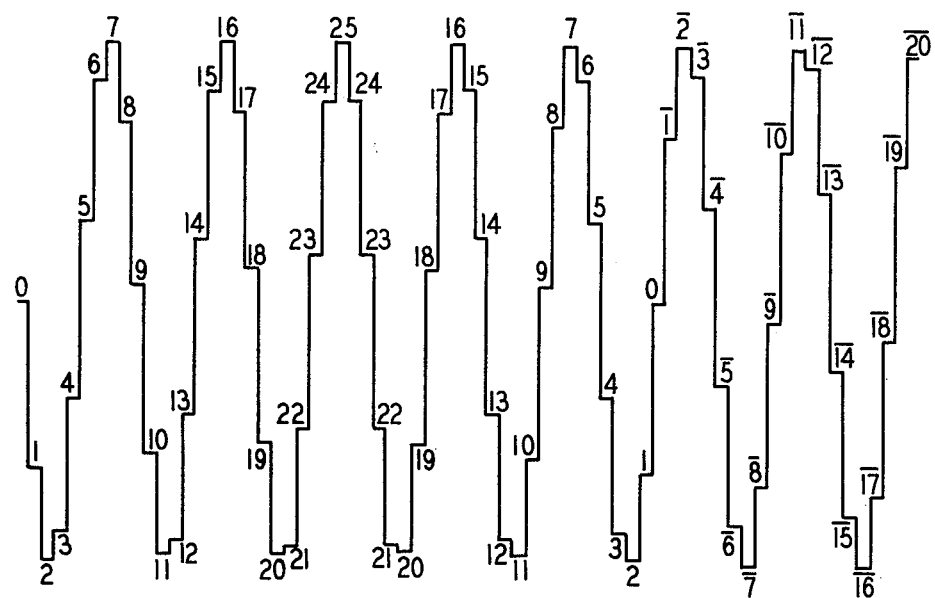
FIG. 3 and FIG. 4 show waveforms defined by digits read out of the generator memories.

The 440 Hz waveform defined by the digit words passed to lead 108 is shown in FIG. 3. The first level in the leftmost portion of the wave is defined as level "0", as seen in FIG. 3, and corresponds to the first or digit word "0" in Table 1, which word, as previously described, is repeated four times. The digit word "0" has a magnitude of 128 which is one-half the maximum magnitude of the wave. Accordingly, the first level constitutes four samples at one-half the maximum magnitude.

Subsequent levels in the 440 Hz wave are identified to correspond with numerical designations of subsequent digit words in Table 1 and portray the magnitudes of the digit words, as described above. The wave levels thus follow magnitudes of the digit words from digit word "1" to digit word "25" and then, as counter 125 down counts, back down to digital word "0". At this point, as previously described, flip-flop 131 is flipped to the set condition, a high condition is applied to lead 111, and the bits of the digit words are applied, interval, to lead 108. The magnitude of succeeding levels of the 440 Hz wave accordingly correspond to the complement of the succeeding digit words; the levels of the wave being identified in FIG. 3 as 1, 2, et cetera, to correspond to the complement of digit word "1", digit word "2", et cetera. Thereafter, when counter 125 up counts to 25 and down counts back to 0, flip-flop 131 is flipped back to the clear condition of the uninverted bits of the digit words are again applied to lead 108.

Figure 4:
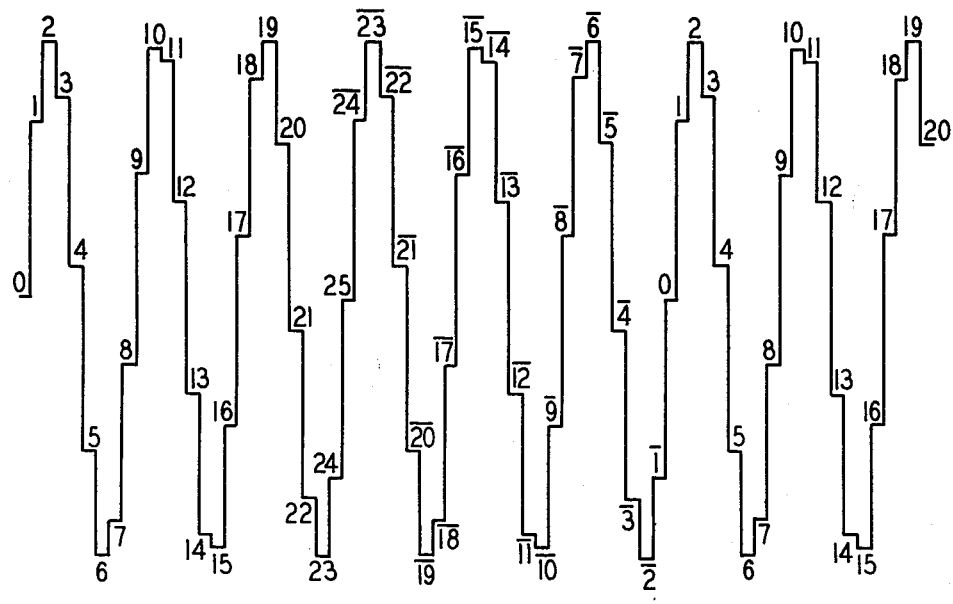

The 480 Hz waveform defined by the magnitudes of the digit words passed to lead 109 is shown in FIG. 4. The first wave level in the leftmost portion of the wave is identified as level "0", as seen in FIG. 4, and corresponds to the numerical designation of the first digit word in Table 2, which is digit word "0". This, as previously described, is repeated four times. The digit word "0" has a magnitude of 128, which is one-half the maximum magnitude of the wave, and the first level accordingly constitutes four samples at one-half the maximum magnitude.

Subsequent levels of the 480 Hz wave are similarly identified to correspond with numerical designations of subsequent digit words in Table 2 and portray the magnitudes thereof. The wave levels thus follow the digit word magnitudes as counter 125 up counts. At this point, flip-flop 132 is set, as previously described. A high condition is applied to lead 111 and counter 125 down counts to select the magnitude of successive digit words starting from digit word "24" and down counting to digit word "0". When counter 125 reaches the count of "0", flip-flop 132 is set, counter 125 starts to count up and the uninverted bits of the digit words are again applied to lead 109.

During the application of each bit of each digit word to leads 108 and 109, the gating signal QA is passed to D/A converters 103, as previously described. The bit on lead 108 is thereby passed through FET switch S1 to capacitor C1 and, at the same time, the bit on lead 109 is passed through FET switch S2 to capacitor C2. Thereafter, the QB pulse is applied to D/A converters 103, as previously described, closing FET switches S3 and S4 and thus placing capacitor C3 in parallel with capacitors C1 and C2 to redistribute the charges on the capacitors.

Capacitor C1 has the same capacity value as C2 and capacitor C3 has twice the capacity value of capacitors C1 or C2 and, therefore, is equal to the value of capacitors C1 and C2 in parallel. Considering only capacitors C1 and C2 and neglecting capacitor C3, the placing of the capacitors in parallel redistributes the bit charge on capacitors C1 and C2 to both capacitors whereby capacitors C1 and C2 retain a bit charge which is the sum of the original charges on capacitor C1 and capacitor C2. C1 was charged to a standard unit charge of 1 and capacitor C2 was charged to 0, the resulting charge on capacitor C1 in parallel with capacitor C2 will be $(1+0)/2=\frac{1}{2}$. If both capacitors are charged to 1 by way of switches S1 and S2, then switching them in parallel will cause the average charge $(1+1)/2=1$ to be stored in the parallel capacity C1+C2. Similarly, an initial charge of 0 on both capacitors C1 and C2 will cause the average charge $(0+0)/2=0$ to be stored in the parallel capacity of capacitors C1+C2.

Capacitors C1 and C2 in parallel have a combined value equal to that of capacitor C3. When capacitors C1 and C2 are placed in parallel with each other and in parallel with capacitor C3 by the QB pulse closing the S3 and S4 swithces, the average charge resulting from connecting capacitors C1 and C2 in parallel is redistributed with the charge on capacitor C3. Assuming an initial charge on capacitor C3 of zero and an average charge of 1 on capacitors C1 and C2 in parallel, connecting capacitors C1, C2 and C3 in parallel will give a resulting value of $\frac{1}{2}$ on capacitor C3. An average charge of ½ on capacitors C1 and C2 will be similarly divided by connecting them in parallel with capacitor C3 to give a resulting value of ¼; and an average charge of 0 on capacitors C1 plus C2 will give a resulting charge of 0 when connected in parallel with a discharged capacitor C3. The voltage on capacitors C1, C2 and C3 in parallel becomes one-half of the voltage difference between the voltage stored across capacitor C3 prior to closure of switches S3 and S4 and the average value of the voltage to which capacitors C1 and C2 are charged prior to closure of switches S3 and S4. When the QB pulse terminates, capacitor C3 retains the resulting "averaged" charge. At each subsequent closure of switches S3 and S4 the previous charge on capacitor C3 is again divided in half by redistribution with capacitors C1 and C2 in parallel and the "average" charge is divided in half by redistribution with capacitor C3.

Figure 6:
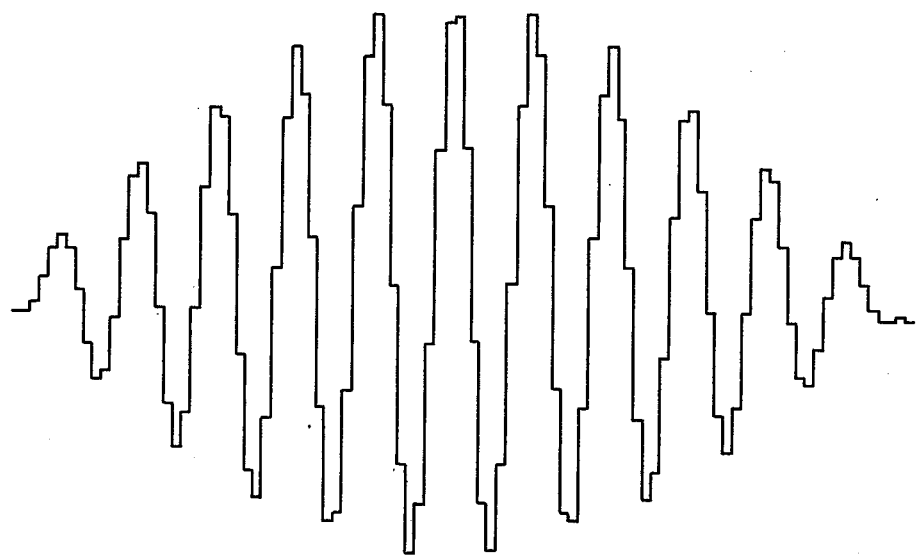

Thus, D/A converters 103 convert the bits on leads 108 and 109 to an "averaged" charge and combine this average charge with average charges derived from other bits of the same digit words, weighted as described above. D/A conversion proceeds in the order of least significant bit first to most significant bit. The resulting successive charges on capacitor C3 at the end of successive digit words on leads 108 and 109 approximate the combined 440 Hz and 480 Hz waves defined by word stores 102 and comprise the waveform shown in FIGS. 3 and 4 as combined by D/A converters 103. A representation of these combined waveforms is shown in FIG. 6.

At the end of each digit word on leads 108 and 109, the QC pulse is applied to quantized sample and hold circuit 104 to switch the cumulative average charge on capacitor C3 through lead 110 and FET switch S5 to capacitor C5. This applies the charge to the input of BIGFET amplifier Q1 with capacity feedback by way of transistor Q2 and capacitor C5. This provides a charge ratio amplifier arrangement in which the change in voltage on capacitor C5 is proportional to the ratio of the value of capacitor C3 to capacitor C5. The ratio of capacitor C3 to C5 may advantageously be made such that the output of amplifier Q2 is at a standard amplitude.

Figure 5:
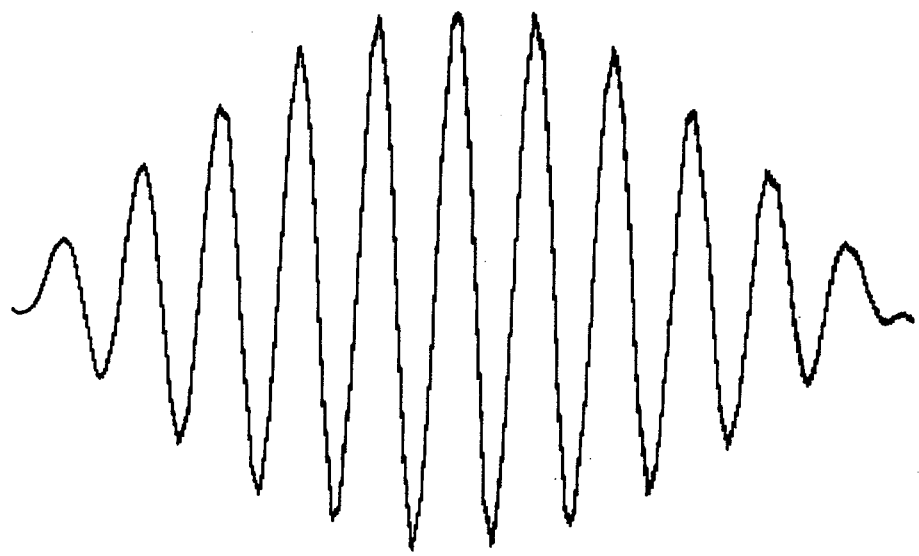
FIG. 5 and FIG. 6 show waveforms formed by outputs of the generator.

The charge stored across capacitor C5 remains stored thereon when switch S5 is opened. At each subsequent closure of switch S5, a small fraction of the charge stored on capacitor C3 as a result of the A/D conversion is added to or subtracted from the charge on capacitor C5 in proportion to the ratio of capacitor C3 to capacitor C5 as noted hereinabove. Transistor Q1 is biased by bias battery 106 such that decoded samples less than average (zero of the AC wave) will cause an increase in the charge stored across capacitor C5 because of the signal inversion in amplifier Q1. Similarly, a decoded sample greater than average will cause a decrease in the charge stored across capacitor C5. As the same words from word stores 102 are decoded four successive times, four equal increments will be added to or subtracted from the charge stored on capacitor C5. When the following words are decoded in turn, they will also contribute four increments to generate a multiple tone signal on output lead 105 as represented by the waveform in FIG. 5 which shows one full beat interval between the samples of 440 Hz and 480 Hz. This pattern is then repeated over and over.

Although a specific embodiment of this invention has been shown and described, it will be understood that various modifications may be made without departing from the spirit of this invention.

I claim:

1. A wave generator comprising a memory for storing a plurality of digit words defining magnitude levels of samples of a corresponding plurality of phases of a wave cycle and means for reading the plurality of stored digit words in a predetermined order which defines sample levels of successive phases of the wave cycle, characterized in that the reading means includes means for reading each stored digit word a plurality of times before reading the next digit word in the predetermined order whereby the rate that the digit words are read by the reading means may be increased without increasing the number of stored digital words, and further includes means for converting the read digit words to the defined wave samples wherein the converting means includes means for integrating the defined wave samples and wherein the integrating means comprises a charge ratio amplifier.

* * * * *